May 23, 1967    R. S. CHALLENDER    3,321,372
NUCLEAR REACTOR CONTROL MECHANISM
Filed Dec. 23, 1964

United States Patent Office 3,321,372
Patented May 23, 1967

3,321,372
NUCLEAR REACTOR CONTROL MECHANISM
Ronald Scott Challender, Appleton, Warrington, England, assignor to Societe Anglo-Belge Vulcain, S.A., Brussels, Belgium
Filed Dec. 23, 1964, Ser. No. 420,702
Claims priority, application Great Britain, Jan. 17, 1964, 2,264/64
4 Claims. (Cl. 176—36)

This invention relates to nuclear reactor control mechanisms in which a reactivity control element, for example of neutron-absorbing material, is movable relative to a reactor core by means of a fluid-operated piston and cylinder device, the device comprising a piston carried by a hollow piston rod so as to be stationary with respect to the reactor core, a drive cylinder which is movable with respect to the piston, and apertures in the piston rod whereby fluid pressure within the cylinder can be adjusted through the piston rod interior; such mechanism is hereinafter referred to as of the type described. In such mechanism the control element is movable between a positive position in which the core reactivity is increased and a negative position in which the core reactivity is decreased. It is conventional to bias the control element towards its negative position.

The present invention provides, in one of its aspects, a nuclear reactor control mechanism of the type described wherein a relief valve located in the piston is biassed to open and is linked to a pilot piston within the piston rod, the pilot piston being movable to close the relief valve under the action of fluid pressure within the piston rod. Preferably the apertures in the piston rod providing for communication between the interiors of the piston rod and the drive cylinder are arranged to be opened by movement of the pilot piston to close the relief valve.

A control mechanism in accordance with the invention has a robust, uncomplicated nature whilst incorporating a reliable, quick-acting relief valve for rapid movement of the control element to its negative position.

Figure 1:
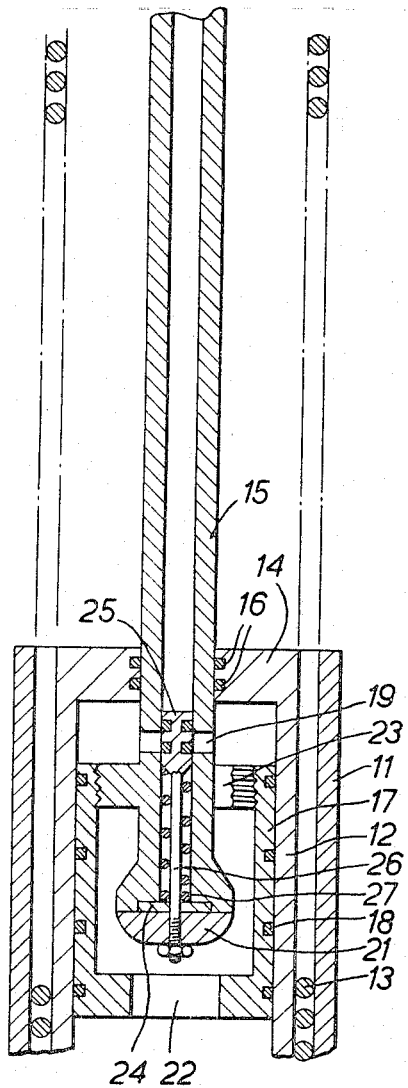
Figure 2:
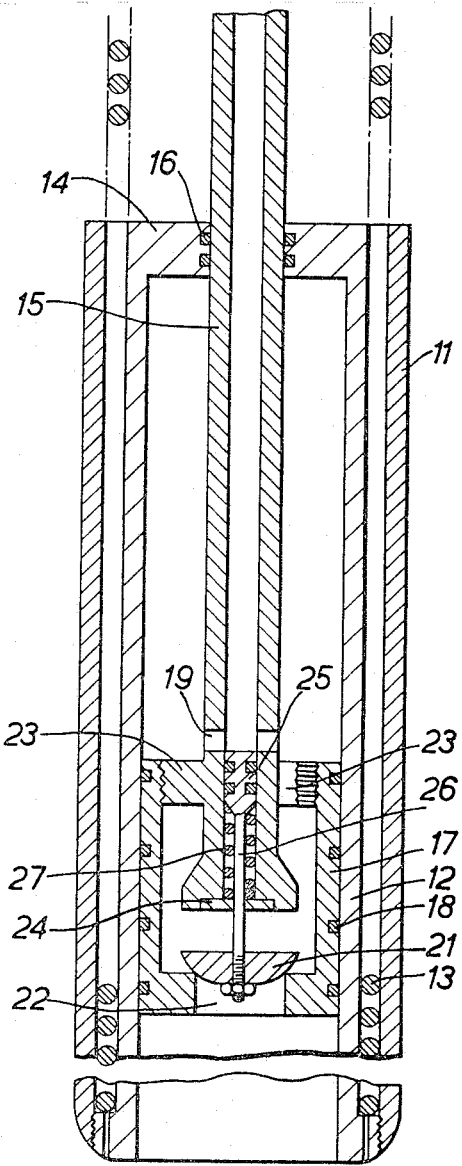

One construction of nuclear reactor control mechanism embodying the invention is described below by way of example with reference to the accompanying drawings in which:

FIGURE 1 shows a diagrammatic section through the mechanism in its relaxed state, and FIGURE 2 shows a similar section through the mechanism in its pressurised state.

The nuclear reactor control mechanism shown in the drawings is suitable for use as a safety device in a pressurised water nuclear reactor for marine propulsion. The mechanism is mounted in a casing secured above a reactor core, for example on a fixed structure of the core, such as a core top plate, and serves to raise a neutron-absorbing control element or member out of the core for normal reactor operation whilst having the capability of accelerating the member into the core during any uncontrolled incident in the operation of the reactor.

The mechanism has a hollow cylindrical, neutron absorbing control element or member 11 typically of boron sheathed in stainless steel. The outer member 11 is carried by a coaxial inner drive cylinder 12 with which it is united as by screw-threaded engagement at its lower end. A main compression spring 13 in an annular gap between the member 11 and the hollow spaced cylinder 12 acts on a flange on the lower end of the cylinder 12 and is secured at its upper end to the control mechanism casing and therefore to the fixed structure of the reactor core. The control member 11 is biassed by this main spring 13 towards its in-core or negative position corresponding to a reduction of the reactivity of the core.

The drive cylinder 12 is formed with a head 14 in the form of an integral annular plate which slides on, and is guided by, a fixed hollow piston rod 15; sealing rings 16 located in the head 14 seat on the piston rod. Like the main spring, the piston rod 15 is secured at its upper end to the casing and therefore it is fixed (stationary) relative to the reactor core. A fixed piston 17 at the lower end of and carried by the rod 15 carries sealing rings 18 which bear on the interior of the drive cylinder 12. Apertures 19 in the rod 15 and immediately above the piston 17 are provided to allow (when required) communication between the interiors of the piston rod 15 and the drive cylinder 12. Pressurisation of the drive cylinder above the pressure of coolant water surrounding the drive cylinder is effected through an inlet to the interior of the rod 15 and then through the apertures 19; such pressurisation, typically with water of similar composition to the reactor coolant water, serves to raise the control unit (member 11 and cylinder 12) out of the core against its bias and thus to raise the reactivity of the core.

The fixed piston 17 is hollow with a lower internally flanged end in which a valve aperture 22 is formed; the aperture 22 is associated with or forms part of a relief valve having a closure member 21 within the piston 17. The piston 17 is screw-threaded on to three circumferentially equi-spaced arms 23 which project radially inward and integrally from the piston rod 15. Within the piston 17, the lower end of the piston rod 15 is enlarged and recessed to receive a retaining plate 24. A pilot piston 25 slidable within the lower end of the pison rod 15 is linked by a stem 26 to the valve closure member 21, the valve closure member being located on a recessed portion of the stem 26 and being secured by a locked nut. The pilot piston 25 has sealing rings to bear on the interior of the rod 15, and the stem 26 is slidable in passage through the annular retaining plate 24, which is secured to the lower end of the rod 15. A pilot compression spring 27 acts between the retaining plate 24 and the pilot piston 25 in a manner to bias the pilot piston upwardly thus raising the valve closure member 21 from its aperture 22 so that the relief valve is biassed to open. In its upper position (FIGURE 1), the pilot piston 25 closes the apertures 19.

When the reactor is sub-critical, the control mechanism is in its relaxed state as shown in FIGURE 1. In this state, the control member 11 is held into the reactor core by the main spring 13 and the valve closure member 21 is raised off the aperture 22 by the pilot spring 27; the pilot piston 25 being in its upper position provides that the apertures 19 are closed. During normal reactor operation, the control member 11 is raised out of the core by applying to the interior of the piston rod 15 water which is pressurised above the pressure of water surrounding the control mechanism. Under the effect of such internal pressure in the piston rod, the pilot piston 25 is depressed against the action of the pilot spring 27 thus opening the apertures 19 and causing the member 21 to close the aperture 22, this pressurized state of the mechanism is shown in FIGURE 2. Pressurized water in the interior of the rod 15 is thus admitted into the drive cylinder 12 through the apertures 19 and causes the drive cylinder to rise relative to the fixed piston 17 against the bias of the spring 13 and the control member 11 is accordingly withdrawn upwardly from the core. The control member is retained in its raised or positive position during reactor operation by continued pressurisation of the piston rod interior above the pressure of water surrounding the control mechanism.

In the event of an uncontrolled incident in the operation of the reactor requiring rapid shut-down of the reactor, the pressure in the interior of the piston rod 15 is equalised through the inlet with that surrounding the control mechanism. Depressurisation of the interior of the piston rod 15 in this way permits the mechanism rapidly to assume its relaxed state with apertures 19 closed and aperture 22 open. The main spring 13 drives the control member 11 rapidly downward into the core whilst water displaced by the drive cylinder is rapidly discharged through the open aperture 22.

The internally flanged lower end of the piston 17 effectively forms a valve seat for the closure member 21 located in the piston. It is to be appreciated that the inlet to the interior of the rod 15 has a valve which can supply to the interior of the rod 15 either water at the pressure of that surrounding the mechanism or at a pressure above that of the water surrounding the mechanism, such higher pressure being obtained for example by use of an auxiliary pump.

It is to be understood that the invention is not limited by the details of the foregoing example. For instance the invention could be embodied in a regulating mechanism, as opposed to a safety device, such regulating mechanism being provided with means to select positions for the control member which are intermediate the two extreme positions corresponding to maximum withdrawal and maximum insertion. Furthermore, the drive cylinder could be integral with the reactivity control element.

The control mechanism described above by way of example has a robust, uncomplicated nature and yet incorporates a reliable, quick-acting relief valve for rapid movement of the control member to its in-core position in the event of abnormal reactor operation.

I claim:
1. In a nuclear reactor control mechanism having a movable reactivity control element and a fluid-operated piston and cylinder device for movement of said element, the improvement wherein said device comprises: a stationary hollow piston rod; a stationary piston mounted on said piston rod; a drive cylinder connected to said control element and movably mounted on said piston; said piston rod having apertures which communicate between the hollow interior of said piston rod and the inside of said drive cylinder so that fluid pressure within said cylinder can be adjusted through said hollow piston rod; a relief valve located in said stationary piston and having an open and closed position, said valve having means normally biassing it into said open position; and a pilot piston movably mounted within said hollow piston rod so as to be responsive to pressures therein and linked to said relief valve for moving under the action of fluid pressure within said piston rod and blocking said apertures when said relief valve moves to said open position and unblocking said apertures when said relief valve moves to said closed position.

2. A control mechanism as claimed in claim 1, in which the control element is of a hollow form, the drive cylinder supports said element in spaced coaxial relationship, and a main spring is positioned in the space between said element and said cylinder for biasing said element to a reactivity reducing position.

3. A control mechanism as claimed in claim 1, in which said biassing means comprises a pilot spring biassing said relief valve into said open position, said stationary piston defines a relief valve aperture, and the relief valve comprises a closure member linked to said pilot piston which moves against the bias of the pilot spring to close said valve aperture.

4. A control mechanism as claimed in claim 3, in which the control element is of a hollow form and the drive cylinder supports said element in spaced coaxial relationship, and further comprising a main spring positioned in the space between said element and said cylinder for biasing said element to a reactivity reducing position.

References Cited by the Examiner

UNITED STATES PATENTS

| 2,621,631 | 12/1952 | Dowty | 92—110 |
| 3,088,901 | 5/1963 | Gustafsson et al. | 176—36 |

FOREIGN PATENTS

| 1,367,389 | 6/1964 | France. |
| 806,757 | 12/1958 | Great Britain. |

CARL D. QUARFORTH, *Primary Examiner.*

L. DEWAYNE RUTLEDGE, *Examiner.*

H. E. BEHREND, *Assistant Examiner.*